May 3, 1927.
R. H. HENDERSON
BENDER FOR LIGHT GAUGE CONDUITS OR PIPES
Filed Dec. 10, 1926    2 Sheets-Sheet 1
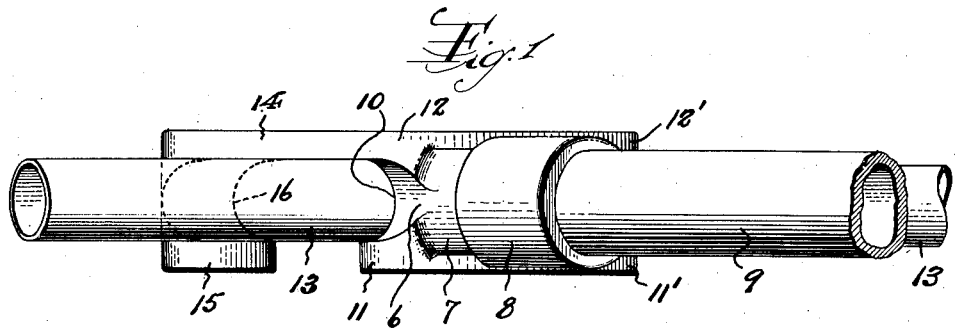
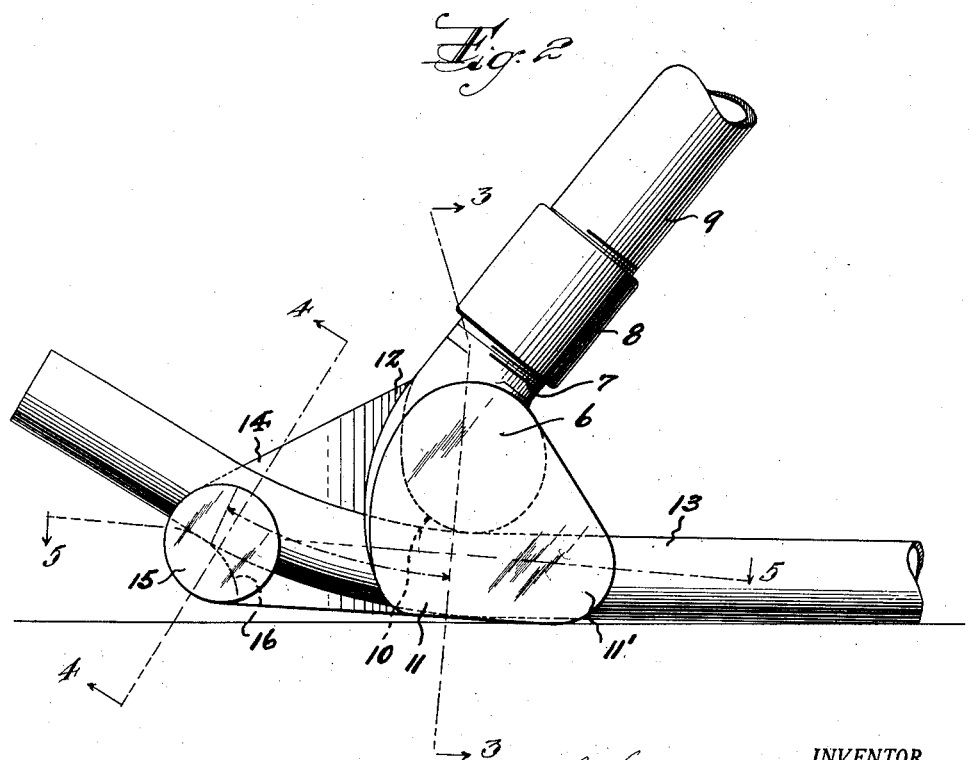
INVENTOR.
Robert Halsey Henderson
BY
Krautzel and Richards
ATTORNEYS.

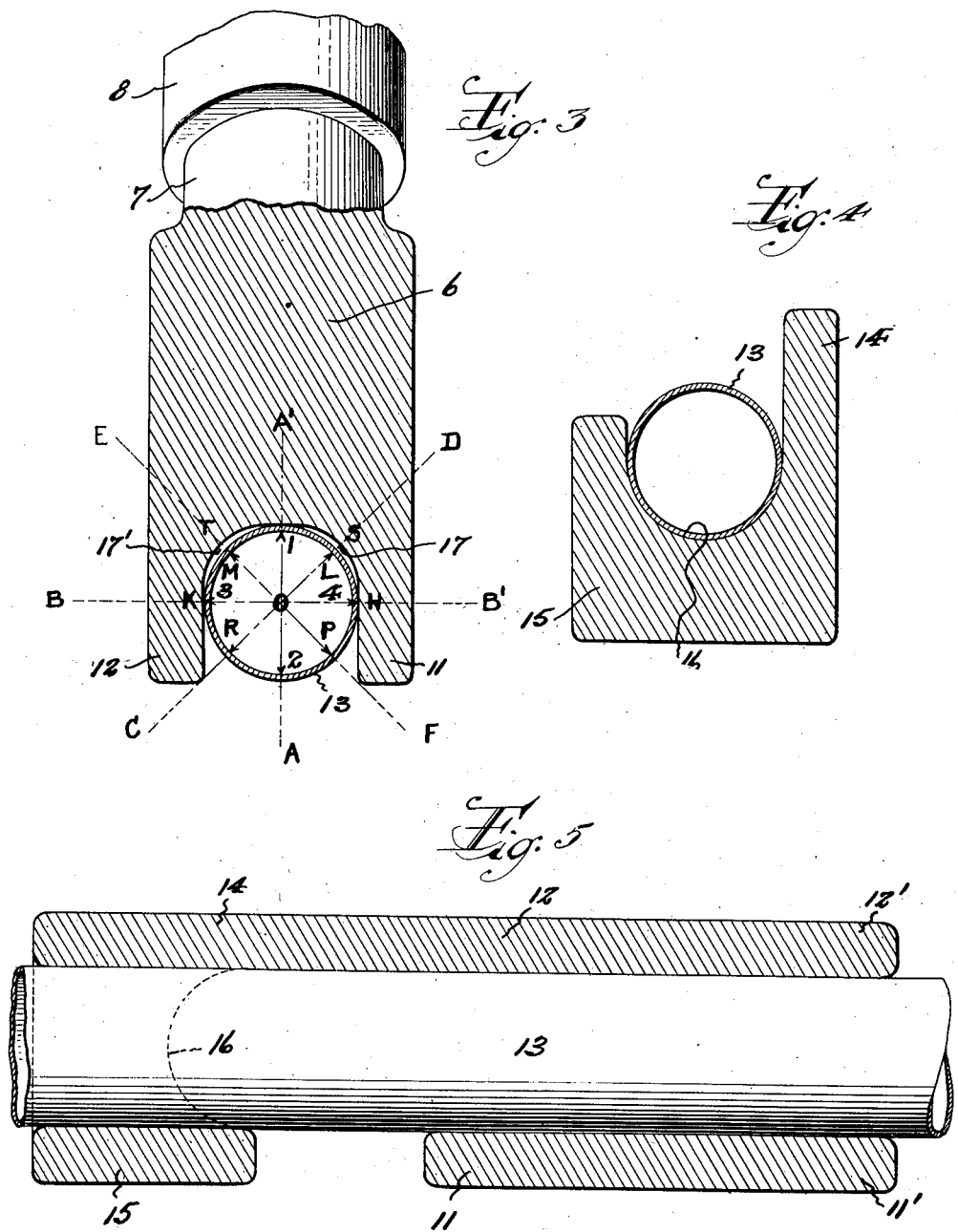

Patented May 3, 1927.

1,627,034

UNITED STATES PATENT OFFICE.

ROBERT HALSEY HENDERSON, OF EAST ORANGE, NEW JERSEY.

BENDER FOR LIGHT-GAUGE CONDUITS OR PIPES.

Application filed December 10, 1926. Serial No. 153,769.

This invention relates, generally, to improvements in hand conduit benders; and the invention has reference, more particularly, to a hand bender or hickey especially designed to bend light gauge rigid conduit or pipe.

Light gauge rigid conduit for installing of electric wiring presents difficulties in bending which are not found in the heavier gauge conduit which possesses the same wall thickness as standard water and gas pipe. The wall of light gauge conduit is too thin to permit of the cutting of standard threads, and such conduit consequently requires the use of compression couplings and outlet-box bushings of some form in joining up the same. The proper and satisfactory use of such couplings and bushings is only possible when the pipe is round with a uniform diameter, and such uniform diameter must be maintained throughout such bending operations as may be required incident to the installing of the conduit. Not only must the ends of the conduit be round but the cross-sectional area of elbows, off-sets, etc., must remain practically unchanged, and the bends must be without kinks, wrinkles or flattened sections, all of which, if permitted, would interfere with the proper drawing in of electrical conductors to be enclosed in such conduit.

The walls of light gauge conduit of ½ inch, ¾ inch and 1 inch sizes, are usually from 40 to 60 thousandths of an inch in thickness, with outside diameters respectively of .840 inch, 1.05 inches and 1.315 inches. Conduit of ½ inch, ¾ inch and 1 inch sizes comprise about ninety-five per-cent of all rigid conduit used. Heavy wall conduit of these sizes are ordinarily bent on the job by means of hand bending hickeys, a tool which consists of some form of bending head mounted on lever or handle about forty inches long. There are many kinds of hand hickeys on the market for the bending of gas and water pipes and heavy wall rigid conduit, but the same are not suitable for bending light gauge rigid conduit with walls only 40 thousandths to 60 thousandths of an inch thick. The reason is that these hickeys depend largely upon the thick wall of the conduit to prevent or resist distortion, with the result that when an attempt is made to bend thin wall conduit with hickeys of heretofore known types, it is found impossible to make any sort of a usable bend. In such attempts the thin wall conduit simply dents or buckles in at points of bending contact on account of there being no adequate support for the sides of the conduit being bent. The bender or hickey heretofore patented by me in United States Letters Patent No. 1,379,016 dated May 24th, 1921, discloses a hickey for heavy wall conduit which has a tight fitting bending groove adapted to support the conduit while the bend is being made. My said patented bender, while very efficient for bending heavy gauge conduit, and more nearly adapted to bend light gauge conduit than any other type of which I am aware, is not entirely satisfactory for the latter purpose for several reasons, viz, the distance between the transverse abutment which holds the outer end of the conduit and the point of impingement in the bending groove is not suitable for conduit with walls but 40 to 60 thousandths of an inch thick, with the result that the end of the conduit is generally pressed out of round, due to pressure at such end being greater than is necessary to hold such thin wall conduit while being bent; furthermore the bending groove conforms in cross-section closely to the contour of the conduit, and since the groove is open at the top and since the thin wall of the conduit is easily moulded under the applied pressure, the result is an undue distortion on the two upper radii of the conduit approximating forty-five degrees on either side of a vertical diameter on which line the bending pressure is exerted. Such conformation of bending groove while producing a practically correct round contour as to the inner half or side of the conduit nevertheless results in a badly flattened outer half or side thereof, giving a general cross-sectional shape or effect similar to the shape of a letter U. Furthermore, the thin wall of light gauge conduit does not have enough rigidity to keep it in shape rearwardly of the bending groove during the bending operation, and consequently the same tends to flatten into oval contour at such points because the sides of the conforming bending groove do not extend back far enough to properly and sufficiently support the conduit against such distortion. Such distortion of the rearward end of the conduit is sufficient to interfere with and prevent the bender or hickey being slipped back on the conduit body so as to permit the step by step bending movements which accompany the proper manipulation of the bender. We are thus confronted by three adverse conditions in bending thin wall conduit in and by the heretofore known types of hand hickeys employed for heavy wall conduit, to wit, first, the forward end is distorted; second, the conduit the rearward portion behind the bending groove is either kinked or bent into an ellipse; and, third, the portion embraced within the bending groove is either wrinkled or flattened. In other words, the physical characteristics of thin wall conduit are so vastly different from those of heavy wall conduit that they require an entirely different set of conditions for bending.

It is the object of the present invention, therefore, to provide an improved form and construction of hand bender or hickey especially adapted for bending light gauge or thin wall conduit, and which will provide proper and adequate conditions of conduit control and manipulation so as to assure smooth kinkless bends.

The present invention is illustrated in the accompanying drawings, in which:—

Figure 1 is a plan or top view of a light gauge conduit bender, showing such conduit as applied thereto during the operations of bending; Figure 2 is a side elevation of the same; Figure 3 is a transverse section on an enlarged scale taken on line 3—3 in Figure 2; Figure 4 is a transverse section on an enlarged scale, taken on line 4—4 in Figure 2; and Figure 5 is a horizontal section, also on an enlarged scale, taken on line 5—5 in said Figure 2.

Similar characters of reference are employed in all of the said views to indicate corresponding parts.

The novel light gauge conduit bender comprises an integral body or head 6 having a threaded shank 7 to receive a suitable coupling 8 for attaching the same to one end of the hand or manipulating lever 9.

The body or head 6 in downward projection from the shank 7 is formed to provide a curved element 10 the periphery of which is approximately semi-circular, and integral with the curved element, at each side thereof, are two parallel flanges 11 and 12 spaced apart at a distance substantially equivalent to the diameter of the conduit 13 to be bent, whereby the conduit 13 may pass with a close sliding fit between said flanges. The curved element 10 and its side bounding flanges 11 and 12 forms a bending groove, further special characteristics of which will be subsequently described. The longitudinal curvature of the curved element 10 is considerably less than the curvature of an elbow or other curve to be formed in the conduit 13.

Integrally formed in connection with the flanges 11 and 12 are rearwardly projecting wings or extensions 11' and 12', the same being prolongations of said flanges 11 and 12 extended rearwardly from the bending point of said curved element 10 for a distance from two to three times the diameter of the conduit 13 to be bent, thus providing supporting elements for retaining the body of the conduit against distortion at points rearward of the applied bending force, and at the same time serving to coin or lead the pipe to the bending point in maintained normal round cross-sectional shape.

The flange 12 is provided with a forward extension 14, from the extremity of which projects transversely, and in opposed relation to the bending groove, an abutment or holding element 15. This abutment post or holding element 15 is provided with a holding groove 16 alined with the main bending groove, the same being of a cross-sectional shape corresponding to the cross-sectional shape of the conduit 13 to be bent so as to provide a sliding fit for the latter, and deeper than the radius of said conduit, so as to grip the sides thereof when submitted to bending strains to thus support and brace the same against flattening distortion. The said abutment post or holding element is forwardly off-set from the point of bending impingement of the curved element 10 for a distance equivalent to two to three times the diameter of the conduit to be bent, with a preferable spacing of two and one-half times such diameter.

By experiment I have determined the fact that the distance between the points of impingement of the conduit on the forward abutment post or holding element and the main bending groove should be substantially within two to three times and preferably about two and one-half times the diameter of the conduit to be bent when the latter possesses a wall thickness of 40 to 60 thousandths of an inch. This ratio I have found to be very critical and essential to satisfactory results in bending the conduit. With a transverse abutment post or holding element having a groove which is a sliding fit for the conduit to be bent and deeper than the radius thereof, and separated approximately two and one-half times the diameter of the conduit from the point of contact at the bottom of the main bending groove, light gauge conduit having the characteristics above set forth will not be crushed or distorted in any way at the outer end, and win not dent or wrinkle at the point of contact with the main bending groove, provided that the latter is properly shaped as to cross-sectional contour and possesses a proper length and spacing of its side walls.

The shape or cross sectional contour of the bending groove is also an extremely critical feature. A groove that is a close fit for the conduit will, upon application of bending strain, produce dents or wrinkles as it does not allow any space for the metal to readjust itself under the applied strains. This re-adjustment is considerable as the outside of a 90 degree or elbow bend elongates ⅞ of an inch to the foot, and the inside shortens ⅞ of an inch to the foot while the bend is being formed. I have discovered that this movement and re-adjustment of the metal can be accommodated and controlled by making the main bending groove with a cross-sectional shape or contour of an entirely novel design. This main bending groove comprises two parallel walls 11 and 12 spaced so as to provide a small clearance or sliding fit for the conduit to be bent, and at the same time of such height as to provide a groove depth substantially equivalent to the diameter of the conduit; in other words the bending groove is given a width and depth which is practically identical with the outside diameter of the conduit. A description of the salient characteristics of the bending groove can best be set forth by describing the actual operation of bending, reference being had more especially to Figure 3 of the drawings. The light gauge conduit is placed on the floor and the hickey is slipped over the conduit so that the forward end of the latter is in contact with the transverse abutment 15 and seated in the embracing or holding groove 16 thereof, and with the rearwardly extending body of the conduit engaged in the bottom of the main bending groove formed by the curved element 10 and its side walls or flanges 11 and 12. Force being applied by pressing down on the handle or lever 9, stretching of the outside and compression of the inside of the conduit begins. The bending force thus applied acts on the axis A—A' primarily, the exerted pressure causing a temporary shortening of the radii O—1 and O—2, and a consequent tendency to lengthening of the radii O—3 and O—4, until the sides of the conduit impinge upon and are gripped upon the parallel sides of the bending groove at H and K. If this pressure were continued with a bending groove having a contour corresponding to the cross-sectional curvature of the top side of the conduit, the radii O—L, O—1 and O—M would remain normal, while the radii O—P and O—R would lengthen and the radius O—2 would substantially shorten until the walls of the conduit would come to rest with a round top and flattened bottom, resembling a capital letter U, as heretofore mentioned, which shape would remain permanently due to the new set of the molecules of the metal. If the pressure were continued beyond this point, with thin wall conduit, a dent or wrinkle would occur at 1 which would destroy the symmetry of the bend. I have discovered, however, a way to obviate these undesirable and in fact prohibitive effects, for I have found that by relieving the groove between the points H—1 and K—1 on the axes C—D and E—F respectively, approximately one and one-half times the thickness of the wall of the conduit, compensating expansion spaces 17 and 17' lying respectively between the central conduit gripping point 1 and side gripping points H and K are provided, so that the bending pressure is distributed substantially equally on the radii O—P, O—R, O—L and O—M outwardly from the center O, and in the direction indicated by the arrow heads in said Figure 3. Said spaces 17 and 17' thus provide what may be called breathing spaces for the bending metal and allow room for manipulation, movement and re-arrangement of the molecular structure of the thin metallic conduit walls, which is necessary to accommodate the considerable movement occurring at these points. While the walls of the conduit move outwardly along the radii O—L and O—M until they strike the limits of the spaces 17 and 17' at S and T, and there is a corresponding movement on the radii O—P and O—R, the distance traveled is within the limits of the natural resiliency of the conduit metal, so that such resiliency permits the conduit to resume substantially its normal round contour as the hickey is slipped along to each successive position in the step by step process of bending until a bend of desired degree or curvature is completed.

To the compensating relief afforded by the above-described critical cross-sectional contour of the main bending groove are added the additional factors of placing the supporting abutment for the outer end of the conduit, with its conduit embracing and supporting holding groove at a point critically located relative to the bending point of the main groove so as to relieve the conduit from excess collapsing strain, found to be preferably two and one-half times the diameter of the conduit to be bent, and the rearward extensions of the flanges or sides of the main bending groove also projecting for a distance from the bending point of the latter approximating two to three times the diameter of the conduit to be bent, so as to effectually prevent distortion of the conduit into elliptical form back of the bender, while at the same time making it possible to "coin" the conduit back into shape, if necessary, as it passes into the main bending groove during the step by step bending operation. These factors taken together result in a novel construction of hand bender or hickey especially adapted to produce smoothly curved bends in thin wall or light gauge conduit without distortion, dents, wrinkles or other mal-formations, thereby furnishing a tool of which there is a growing demand.

Having thus described my present invention, I claim:—

1. A hand bender for thin wall conduit, comprising a curved element having a handle lever extending therefrom, said element having integral parallel side flanges providing with said element a peripheral main bending groove conforming in width substantially to the diameter of the conduit to be bent, said bending groove at the point where the bending operations occur being of a shape to impinge the sides and top of the conduit and being provided with compensating expansion spaces intermediate said top and side points of impingement, and one of said flanges having a forward extension provided with a transverse abutment post spaced relative to the point of bending operation in said main bending groove at a distance approximating from two to three times the diameter of the conduit to be bent.

2. A hand bender for thin wall conduit, comprising a curved element having a handle lever extending therefrom, said element having integral parallel side flanges providing with said element a peripheral main bending groove conforming in width substantially to the diameter of the conduit to be bent, said bending groove at the point where the bending operations occur being of a shape to impinge the sides and top of the conduit and being provided with compensating expansion spaces intermediate said top and side points of impingement, one of said flanges having a forward extension provided with a transverse abutment post spaced relative to the point of bending operation in said main bending groove at a distance approximating from two to three times the diameter of the conduit to be bent, and said side flanges of said bending groove being rearwardly extended to engage and embrace the sides of the conduit for a substantial distance rearwardly of the point of bending operation.

3. A hand bender for thin wall conduit, comprising a curved element having a handle lever extending therefrom, said element having integral parallel side flanges providing with said element a peripheral main bending groove conforming substantially in width and in depth to the diameter of the conduit to be bent, said bending groove at the point where bending operations occur being of a shape to impinge the sides and top of the conduit and being provided with compensating expansion spaces intermediate said top and side points of impingement, one of said flanges having a forward extension provided with a transverse abutment post, said post having a conduit embracing and holding groove deeper than the radius of the conduit to be bent and longitudinally aligned with said main bending groove, and said post being so spaced relative to the point of bending operation in said main bending groove that the point of impingement of the former is distant from the latter two to three times the diameter of the conduit to be bent.

4. A hand bender for thin wall conduit, comprising a curved element having a handle lever extending therefrom, said element having integral parallel side flanges providing with said element a peripheral main bending groove conforming substantially in width and in depth to the diameter of the conduit to be bent, said bending groove at the point where bending operations occur being of a shape to impinge the sides and top of the conduit and being provided with compensating expansion spaces intermediate said top and side points of impingement, one of said flanges having a forward extension provided with a transverse abutment post, said post having a conduit embracing and holding groove deeper than the radius of the conduit to be bent and longitudinally aligned with said main bending groove, said post being so spaced relative to the point of bending operation in said main bending groove that the point of impingement of the former is distant from the latter two to three times the diameter of the conduit to be bent, and said side flanges of said bending groove having rearwardly projecting extensions adapted to engage and embrace the sides of the conduit for a substantial distance rearwardly of the point of bending operations.

In testimony, that I claim the invention set forth above I have hereunto set my hand this 6th day of December, 1926.

ROBERT HALSEY HENDERSON.